United States Patent [19]

Wood

[11] Patent Number: 5,071,101
[45] Date of Patent: Dec. 10, 1991

[54] MOLD FOR AN INTRAOCULAR/CONTACT LENS

[76] Inventor: Kenneth E. Wood, 1855 Macedon Center Rd., Macedon, N.Y. 14502

[21] Appl. No.: 527,507

[22] Filed: Mar. 26, 1990

[51] Int. Cl.[5] .............................................. B29D 11/00
[52] U.S. Cl. .............................. 249/139; 51/216 LP; 51/217 L; 249/61; 264/2.7; 279/16; 409/903; 425/808
[58] Field of Search ................... 425/808; 249/61, 83, 249/117; 264/1.1, 2.7; 51/105 LG, 216 LP, 217 L, 284 R, DIG. 34; 279/1 B, 1 L, 1 SG, 16, 102; 409/166, 199, 903

[56] References Cited

U.S. PATENT DOCUMENTS

| | | | |
|---|---|---|---|
| 3,258,879 | 7/1966 | Edelstein | 425/808 |
| 3,330,331 | 7/1967 | Duckwall et al. | 425/808 |
| 4,517,140 | 5/1985 | Rawlings | 425/808 |
| 4,686,798 | 8/1987 | Petty et al. | 51/217 L |
| 4,749,530 | 6/1988 | Kunzler | 51/284 R |
| 4,924,739 | 5/1990 | Ademovic | 51/216 LP |

FOREIGN PATENT DOCUMENTS 1-176242 7/1989 Japan .................................. 425/808

Primary Examiner—James C. Housel
Attorney, Agent, or Firm—Lawrence P. Kessler

[57] ABSTRACT

A casting mold for use in the manufacture of intraocular/contact lenses. The casting mold comprises a base and a cup-like feature attached to the base. The base has a frusto-conical configuration defined by a first planar circular cross-sectional area taken adjacent to the cup-like feature and a second planar circular cross-sectional area taken at a distance remote from the cup-like feature. The circumferences of the fist and second cross-sectional areas respectively form lips. The first cross-sectional area is substantially less than the second cross-sectional area, and the portion of the base defining its side walls extends between the respective lips of the first and second cross-sectional areas and lies substantially within the generatrix of a line connecting the respective lips of the first and second cross-sectional areas rotated about the axis connecting the centers of the first and second cross-sectional areas. A segment of the base along a chord cutting the circumference of the base has been removed. The defined configuration of the casting mold facilitates location of the mold in a collet of a lens generating lathe.

7 Claims, 2 Drawing Sheets

MOLD FOR AN INTRAOCULAR/CONTACT LENS

BACKGROUND OF THE INVENTION

This invention is directed in general to casting molds for intraocular and contact lenses, and more particularly to a simplified casting mold construction accurately retainable in a lathe for grinding and polishing the external lens surface.

One method for making plastic intraocular and contact lenses comprises casting a liquid monomer in a mold having a cup-like structure with a convex optically defined surface, polymerizing the monomer to form a solid thereof, and grinding and polishing the surface of the solid lens material opposite the convex surface while the material is supported by the mold. In general practice, the mold containing the cast lens is mounted in a collet which is, in turn, supported in a lens generating lathe. Placement of the collet within the lathe necessitates accurate measurement to assure that the lens after grinding and polishing is of the desired finished dimensions.

In U.S. Pat. No. 4,749,530 (issued June 7, 1988 in the name of Kunzler), a mold for forming an intraocular and contact lens is shown which includes a cup-like mold cavity integrally formed with a hollow base. The base has a hemispherical external shape with a constant sized key way which follows the surface of the hemispherical base. The hemispherical base engages and mates with a guide key in a hemispherical shaped locating ring of a lens generating lathe. This patent also suggests that the base may have a finned frusto-conical base, the fins serving to position the mold in the locating ring of the lens generating lathe. In either instance, the manufacture of the lens mold with the multi-featured base is complex and requires the maintenance of tight tolerances to assure that the mold is suitably configured for receipt in the lens generating lathe.

SUMMARY OF THE INVENTION

This invention is directed to a casting mold for use in the manufacture of intraocular and contact lenses. The casting mold comprises a base and a cup-like feature attached to the base. The base has a frusto-conical configuration defined by a first planar circular cross-sectional area taken adjacent to the cup-like feature and a second planar circular cross-sectional area taken at a distance remote from the cup-like feature. The circumferences of the first and second cross-sectional areas respectively from lips. The first cross-sectional area is substantially less than the second cross-sectional area, and the portion of the base defining its side walls extends between the respective lips of the first and second cross-sectional areas and lies substantially within the generatrix of a line connecting the respective lips of the first and second cross-sectional areas rotated about the axis connecting the centers of the first and second cross-sectional areas. A segment of the base along a chord cutting the circumference of the base has been removed. The defined configuration of the casting mold facilitates location of the mold in a collet of a lens generating lathe.

This invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
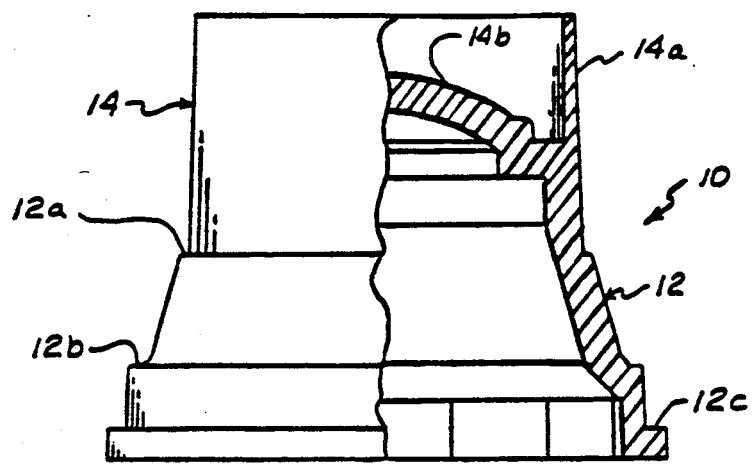
FIG. 1 is a side elevational view, partly in cross-section, of an intraocular and contact lens mold according to this invention.
Figure 2:
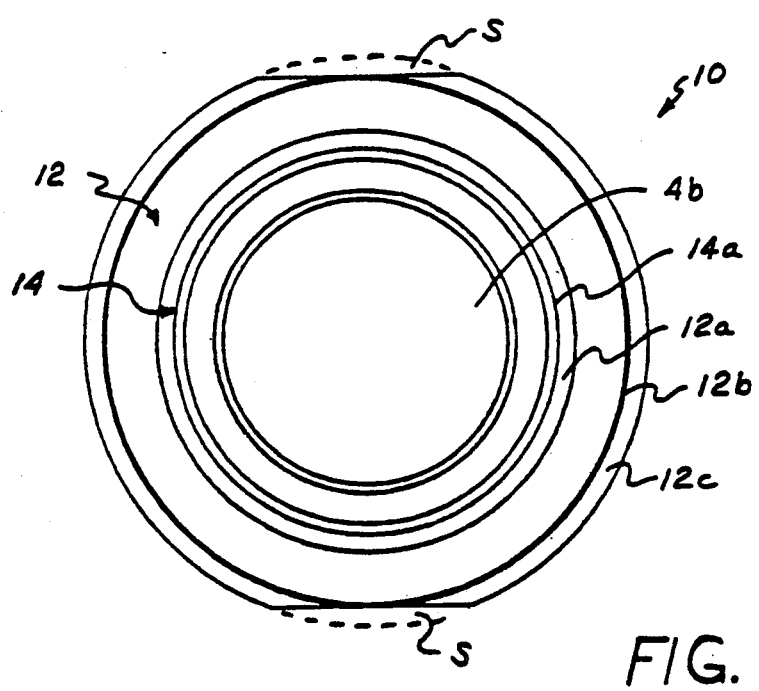
FIG. 2 is a top elevational view of the intraocular and contact lens mold of FIG. 1.

Referring now to the accompanying drawings, FIGS. 1 and 2 show an intraocular and contact lens casting mold, designated generally by the numeral 10, according to this invention. The mold 10 includes a main body portion 12 integrally connected to a recess defining cup-like portion 14. The cup-like portion 14 defines an open cavity having exterior wall 14a and a floor 14b particularly configured to establish an optically determined surface complementary to the concave surface of the lens to be formed in the mold. As discussed above, the recess is adapted to receive the monomer from which the lens is to be cast, with the floor 14b determining the concave surface of the cast lens.

The main body portion 12 of the mold 10 describes a base having substantially frusto-conical configuration. This configuration is established by a lip 12a at the bottom of the cup-like portion 14 and a lip 12b spaced from the lip 12a in the opposite direction from the cup-like portion. The lip 12a defines a first planar circular cross-sectional area, and the lip 12b defines a second planar circular cross-sectional area. The first cross-sectional area of the lip 12a is substantially less than said second cross-sectional area of the lip 12b. The side walls of the main body portion 12 extending between the respective circumferences of the first and second lips have a somewhat concave curvature so as to lie substantially within the generatrix of a line connecting the respective circumferences of the first and second lips and rotated about the axis connecting the centers of the first and second lips.

Figure 3:
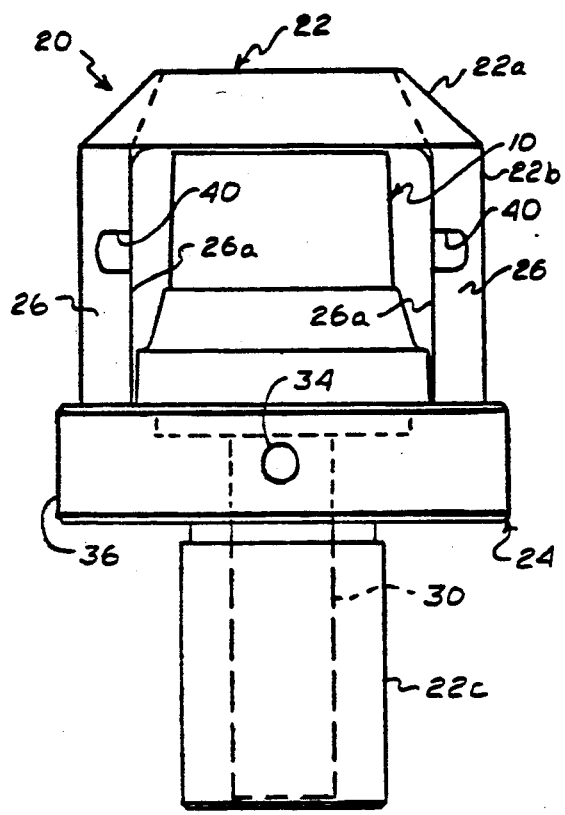
FIG. 3 is a side elevational view of the intraocular and contact lens mold inserted into a collet for a lens generating lathe.
Figure 4:
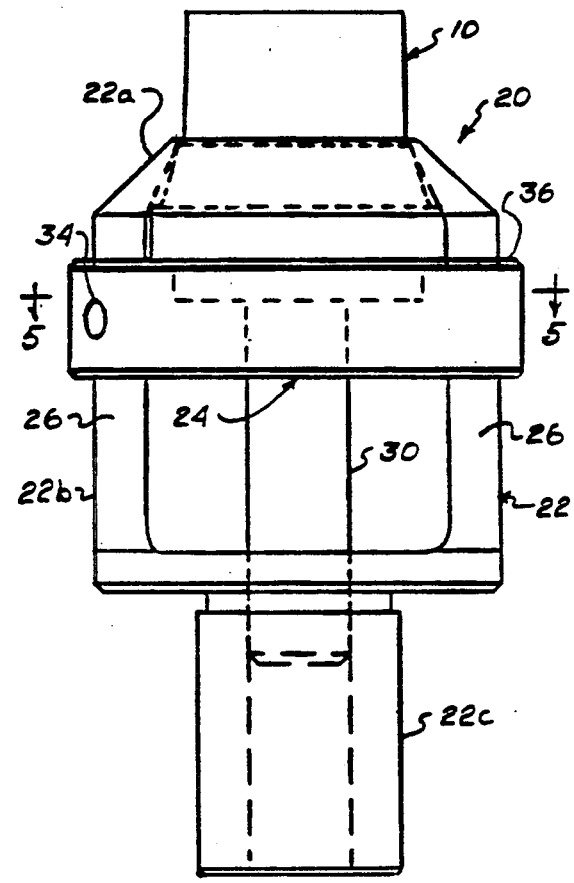
FIG. 4 is a side elevational view of the intraocular and contact lens mold in grinding position within the collet for a lens generating lathe.
Figure 5:
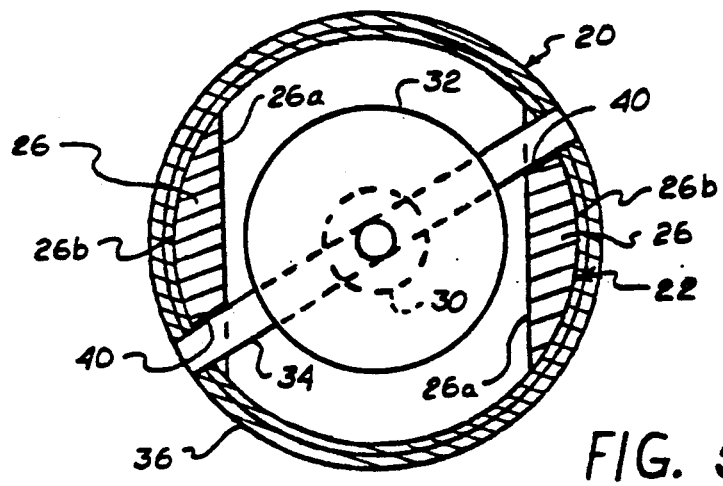
FIG. 5 is a cross-sectional view of the collet for the lens generating lathe taken along the lines 5—5 of FIG. 4.

The purpose of this described configuration for the mold 10 according to this invention is for facilitating the positioning of the mold 10 within a collet 20 suitable for mounting in a lens generating lathe (not shown). The collet 20, best shown in FIGS. 3–5, includes a body member 22 and a slidable locking member 24. The collet body member 22 has a lead end 22a, a central portion 22b, and a tail end 22c.

The central portion 22b of the collet body member comprises a pair of spaced arms 26 connected to the lead and tail ends of the body member to form a recess therebetween for receiving the mold 10. The interior walls 26a of the arms 26 are flatted and spaced apart a distance of a dimension somewhat less than the circumference of a selected cross-sectional area of the mold 10.

In the preferred embodiment shown, the selected cross-sectional area is that of a lip 12c located adjacent to the lip 12b. The lip 12c is similarly flatted by having segment S of its cross-sectional area removed along a chord cutting the circumference of such cross-sectional area (see FIG. 2). In this manner, the mold 10 inserted in the recess of the central portion 22b will be prevented from rotating relative to the collet 20. The exterior walls 26b of the arms 26 are substantially cylindrical and form guides for the slidable locking member 24 as will be described below.

The tail end 22c of the collet body member 22 is a substantially cylindrical member adapted to be received in the lens generating lathe. The locking member 24 includes a shaft 30 slidably received in a longitudinal bore 28 defined in the cylindrical member of the tail end 22a. A base 32 is attached to the shaft 30 and serves as a seat for a intraocular and contact lens mold 10 when the mold is retained in the collet 20 for finishing of the lens cast in the mold.

A rod 34 extends transversely through the base 32 of the locking member 24. The rod 34 connects to a ring 36 which rides on, and is guided by, the exterior walls 26b of the arms 26. Manual movement of the ring 36 by an operator, with a mold 10 seated on the base 32, urges the mold into engagement with the lead end 22a of the collet body member 22. The interior wall of the lead end 22a is of a frusto-conical configuration substantially complementary with the frusto-conical configuration described between the lips 12a and 12b of the mold body member 12. As such, when the seated mold 10 is moved by the ring 36, the lips 12a and 12b thereof will engage the interior wall of the lead end 22a. The fact that the mold and lead end of the collet body contact along two spaced circumferential lines causes the mold to be automatically centered in the collet body. Further, it allows for accommodation of tolerances in the mold and/or collet construction.

The arms 26, adjacent to the interior walls 26a thereof, define opposed recesses 40. The recesses 40 are adapted to receive the rod 34 of the locking member 24 when the ring 36 of the locking member is appropriately rotated. With the rod 34 located in the recesses 40, the locking member 24 is prevented from sliding relative to the collet body member 22. Of course, other arrangements for selectively preventing sliding of the locking member, such as a bayonet slot and pin associated with the shaft 30 of the locking member, are suitable for use with this invention.

The recesses 40 in the arms 26 of the collet body member 22 are spaced from the lead end 22a a distance which assures that when the ring 36 is rotated to locate the rod 34 in the recesses, the mold 10 seated on the base 32 will be positively secured in the collet 20 between the base and the interior wall of the lead end. In this manner, the mold is thus held in a proper position by the collet 20 such that when the collet is received in a lens generating lathe, the mold is located to have the cast lens therein suitably finished by the lathe.

The invention has been described in detail with particular reference to a preferred embodiment thereof, but it will be understood that variations and modifications can be effected within the spirit and scope of the invention as described hereinabove and as defined in the appended claims.

I claim:

1. A casting mold for use in the manufacture of intraocular and contact lenses, said casting mold comprising: a base and a portion defining a cavity attached to said base, said base having a frusto-conical configuration defined by a first planar circular, cross-sectional area, taken adjacent to said cavity, having its circumference forming a lip and a second planar circular cross-sectional area, taken at a distance remote from said cavity, having its circumference forming a lip, said first cross-sectional area being substantially less than said second cross-sectional area, and side walls extending between the respective lips of said first and second cross-sectional areas and lying substantially within the generatrix of a line connecting the respective lips of said first and second cross-sectional areas and rotated about the axis connecting the centers of said first and second cross-sectional areas, and a portion of said base adjacent to said first or second cross-sectional areas having a chord portion removed along a chord cutting the circumference of said base.

2. The casting mold of claim 1 wherein said side walls of said frusto-conical configuration extending between the respective lips of said first and second cross-sectional areas have a substantially concave curvature relative to said generatrix of a line connecting the respective lips of said first and second cross-sectional areas and rotated about the axis connecting the centers of said first and second cross-sectional areas so as to lie therewithin.

3. For use in the manufacture of intraocular and contact lenses where lens material is cast in a mold and said mold is thereafter held in a collet for a lens generating lathe, a casting mold and collet configuration comprising:

a casting mold including a base and a portion defining a cavity attached to said base, said base having a frusto-conical configuration defined by a first planar circular cross-sectional area, taken adjacent to said cavity, having its circumference forming a lip and a second planar circular cross-sectional area, taken at a distance remote from said cavity, having its circumference forming a lip, said first cross-sectional area being substantially less than said second cross-sectional area, and side walls extending between the respective lips of said first and second cross-sectional areas and lying substantially within the generatrix of a line connecting the respective lips of said first and second cross-sectional areas and rotated about the axis connecting the centers of said first and second cross-sectional areas, and a portion of said base adjacent to said first or second cross-sectional areas having a chord portion removed along a chord cutting the circumference of said base; and a collet including means for receiving said casting mold, said receiving means having a lead end adapted to be engaged by said lips of said first and second cross-sectional areas of said casting mold base, and means for urging said casting mold into engagement with said lead end locking said casting mold in such engaged position.

4. The casting mold of claim 3 wherein said side walls of said frusto-conical configuration extending between the respective lips of said first and second cross-sectional areas have a substantially concave curvature relative to said generatrix of a line connecting the respective lips of said first and second cross-sectional areas and rotated about the axis connecting the centers of said first and second cross-sectional areas so as to lie therewithin.

5. The casting mold and collet configuration of claim 3 wherein said receiving means has a flatted portion adapted to engage said portion of said casting mold base with said removed segment to prevent said casting mold from rotating in said collet.

6. The casting mold and collet configuration of claim 3 wherein said urging means includes a seat for said casting mold, a ring supported on said receiving means for sliding movement along the longitudinal axis of said receiving means toward and away from said lead end, and a rod connecting said seat to said ring.

7. The casting mold and collet configuration of claim 6 wherein said ring is also supported for rotational movement about the longitudinal axis of said receiving means, and said receiving means defines a recess for receiving said rod when said ring is rotated relative to said receiving means for locking said seat against further sliding movement.

* * * * *